US012651837B2

(12) United States Patent
Zhang et al.

(10) Patent No.: US 12,651,837 B2
(45) Date of Patent: Jun. 9, 2026

(54) WIDE-BAND WAVE-TRANSMITTING/FILTERING RADIATION UNIT, SHARED-APERTURE ANTENNA ARRAY, AND COMMUNICATION DEVICE

(71) Applicants: South China University of Technology, Guangzhou (CN); COMBA TELECOM TECHNOLOGY(GUANGZHOU) LTD., Guangzhou (CN)

(72) Inventors: Xiuyin Zhang, Guangzhou (CN); Yu Wang, Guangzhou (CN); Huafeng Su, Guangzhou (CN); Peitao Liu, Guangzhou (CN); Litao Chen, Guangzhou (CN); Rongchao Dai, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 19/124,364

(22) PCT Filed: Sep. 2, 2024

(86) PCT No.: PCT/CN2024/116206

§ 371 (c)(1),
(2) Date: Apr. 25, 2025

(87) PCT Pub. No.: WO2025/130147

PCT Pub. Date: Jun. 26, 2025

(65) Prior Publication Data

US 2026/0121296 A1 Apr. 30, 2026

(30) Foreign Application Priority Data

Apr. 12, 2024 (CN) ........................ 202410437271.7

(51) Int. Cl.
*H01Q 5/50* (2015.01)
*H01Q 1/50* (2006.01)
*H01Q 21/26* (2006.01)

(52) U.S. Cl.
CPC ................. *H01Q 5/50* (2015.01); *H01Q 1/50* (2013.01); *H01Q 21/26* (2013.01)

(58) Field of Classification Search
CPC ............. H01Q 5/50; H01Q 1/50; H01Q 21/26
See application file for complete search history.

(56) References Cited

U.S. PATENT DOCUMENTS

2020/0127389 A1 4/2020 Li et al.
2022/0239008 A1 * 7/2022 Luo ........................ H01Q 1/521
(Continued)

FOREIGN PATENT DOCUMENTS

CN 114122700 A 3/2022
CN 116885428 A 10/2023
(Continued)

OTHER PUBLICATIONS

Jiang-Hong Lan, Study of Aperture-Shared Antennas and Filtering Antennas for Mobile Communication Applications, China Academic Journal Electronic Published House, Mar. 2022.
(Continued)

*Primary Examiner* — Dieu Hien T Duong
(74) *Attorney, Agent, or Firm* — The Dobrusin Law Firm, P.C.

(57) ABSTRACT

A wide-band wave-transmitting/filtering radiation unit, a shared-aperture antenna array, and a communication device are disclosed. The radiation unit includes a radiation structure and a feed structure, where the radiation structure and the feed structure are coupled for feeding, so that the radiation structure radiates low-frequency electromagnetic wave signals outward; the radiation structure includes a
(Continued)

radiator, and the radiator is loaded with a plurality of layers of surface periodic structures; when the radiation structure operates in a first mode, electromagnetic waves excited by a high-frequency radiation unit irradiates the radiation structure, and the radiator and the plurality of layers of surface periodic structures collectively form a non-resonant node spatial band-pass filter circuit with K resonant points and K null points; and when the radiation structure operates in a second mode, low-frequency electromagnetic waves excite the radiation structure by means of the feed structure, and units of the plurality of layers of surface periodic structures are excited by the radiator in a parallel manner to form an equivalent filter circuit. The present disclosure can improve radiation pattern distortion of a multi-band antenna, and enhance indexes such as antenna gain, out-of-band suppression, and a cross-polarization ratio.

14 Claims, 11 Drawing Sheets

(56) References Cited

U.S. PATENT DOCUMENTS

2022/0320716 A1* 10/2022 Zhang ................ H01Q 15/0013
2023/0318188 A1* 10/2023 Cui ...................... H01Q 19/108

FOREIGN PATENT DOCUMENTS

| | | | |
|---|---|---|---|
| CN | 118040336 | A | 5/2024 |
| WO | 2022/237405 | A1 | 11/2022 |
| WO | 2023/077839 | A1 | 5/2023 |

OTHER PUBLICATIONS

International Search Report dated Dec. 12, 2024, Application No. PCT/CN2024/116206.

Feifei Jia, A new multi-brand multi-array antenna configuration with scattering suppression for readiation pattern distortion mitigation of base station, May 24, 2022, IEEE Transactions on Antennas and Propagation.

* cited by examiner

WIDE-BAND WAVE-TRANSMITTING/FILTERING RADIATION UNIT, SHARED-APERTURE ANTENNA ARRAY, AND COMMUNICATION DEVICE

FIELD OF THE INVENTION

The present disclosure relates to a wide-band wave-transmitting/filtering radiation unit, a shared-aperture antenna array, and a communication device, which belongs to the technical field of mobile communication.

BACKGROUND OF THE INVENTION

With the large-scale commercialization of 5G mobile communication systems, array antennas operating in different frequency bands share a single reflection surface to form a shared-aperture antenna. To reduce a surface area of the antenna, high-frequency antenna radiation units are usually arranged around low-frequency radiation units. The closer physical distance between the high-frequency and low-frequency radiation units indicates more severe interference. The interference between the high-frequency and low-frequency radiation units is classified into two types; one type is inter-radiation interference, that is, electromagnetic waves radiated by the high-frequency antenna irradiate the low-frequency radiation units, inducing electromagnetic induction in the low-frequency radiation units, which excites the electromagnetic wave radiation, thereby causing a radiation pattern of the high-frequency antenna array to be distorted due to superposition of two electromagnetic waves. This type of interference is typically mitigated by making the low-frequency radiation units capable of transmitting electromagnetic waves, thereby improving the distortion of the high-frequency radiation pattern. The other type is self-radiation interference, that is, the low-frequency radiation units, in addition to exciting electromagnetic waves within its own operation frequency band, also generate electromagnetic wave excitation at twice or three times their operating frequency due to a harmonic effect. This type of interference is usually addressed by employing an additional filter circuit. Currently, the integration of both wave transmission and filtering functions into a radiation surface is not achieved.

SUMMARY OF THE INVENTION

In view of this, the present disclosure provides a wide-band wave-transmitting/filtering radiation unit, a shared-aperture antenna array, and a communication device, improving radiation pattern distortion of a multi-band antenna, and enhance indexes such as antenna gain, out-of-band suppression, and a cross-polarization ratio.

A first purpose of the present disclosure is to provide a wide-band wave-transmitting/filtering radiation unit.

A second purpose of the present disclosure is to provide a shared-aperture antenna array.

A third purpose of the present disclosure is to provide a mobile communication device.

The first purpose of the present disclosure may be achieved by employing the following technical solutions:

a wide-band wave-transmitting/filtering radiation unit includes a radiation structure and a feed structure, where the radiation structure and the feed structure are coupled for feeding, whereby the radiation structure radiates low-frequency electromagnetic wave signals outward; and the radiation structure includes a radiator, and the radiator is loaded with a plurality of layers of surface periodic structures;

when the radiation structure operates in a first mode, electromagnetic waves excited by a high-frequency radiation unit irradiate the radiation structure, the radiator and the plurality of layers of surface periodic structures on the radiation structure collectively form a non-resonant node spatial band-pass filtering circuit with K resonant points and K null points, and K≥1; and when the radiation structure operates in a second mode, low-frequency electromagnetic waves excite the radiation structure by means of the feed structure, and units of the plurality of layers of surface periodic structures are excited by the radiator in a parallel manner to form an equivalent filtering circuit.

Further, the radiator includes four radiation arms, the four radiation arms are arranged on a baseboard, the four radiation arms are respectively a first radiation arm, a second radiation arm, a third radiation arm, and a fourth radiation arm, the first radiation arm and the third radiation arm constitute +45° polarization of a low-frequency radiation unit, and the second radiation arm and the fourth radiation arm constitute −45° polarization of the low-frequency radiation unit.

Further, each radiation arm includes a plurality of wave-transmitting/filtering units and a feed block, each wave-transmitting/filtering unit includes two metal straight edges, a first U-shaped open-circuit unit, and a second U-shaped open-circuit unit, and the feed block is connected with the feed structure;

the two metal straight edges are respectively arranged at a top layer and a bottom layer of the baseboard, the two metal straight edges are connected via a metal through hole, and the metal straight edges of the plurality of wave-transmitting/filtering units and the feed block are sequentially connected to form an annular polygon; and the first U-shaped open-circuit unit and the second U-shaped open-circuit unit are located at one side or two sides of the metal straight edges, and dual-band or wide-band wave transmission is achieved by controlling a resonant frequency of the first and second U-shaped open-circuit units.

Further, when the first U-shaped open-circuit unit and the second U-shaped open-circuit unit are located at one side of the metal straight edges, the first U-shaped open-circuit unit is arranged at the top layer of the baseboard, and the second U-shaped open-circuit unit is arranged at the bottom layer of the baseboard; or the first U-shaped open-circuit unit is arranged at the bottom layer of the baseboard, and the second U-shaped open-circuit unit is arranged at the top layer of the baseboard.

Further, when the first U-shaped open-circuit unit and the second U-shaped open-circuit unit are located at two sides of the metal straight edges, the first U-shaped open-circuit unit is arranged at the top layer of the baseboard, and the second U-shaped open-circuit unit is arranged at the bottom layer of the baseboard; or the first U-shaped open-circuit unit is arranged at the bottom layer of the baseboard, and the second U-shaped open-circuit unit is arranged at the top layer of the baseboard; or the first and second U-shaped open-circuit units are collectively arranged at the top layer of the baseboard, or the first and second U-shaped open-circuit units are collectively arranged at the bottom layer of the baseboard.

Further, a width of the metal straight edges is 1.5 mm to 2 mm.

Further, a total length of the first and second U-shaped open-circuit units is half of an operation wavelength of a corresponding wave-transmitting frequency band, a line width is 1 mm to 2 mm, a width of a U-shaped opening is 2 mm to 5 mm, and distances from the first and second U-shaped open-circuit units to the metal straight edges are respectively 0.01 to 0.03 times a wavelength of the corresponding frequency band.

Further, one of the first and second U-shaped open-circuit units is unfolded into a shape of the equivalent resonant circuit.

Further, the equivalent resonant circuit is in a linear shape, and U-shaped the open-circuit unit that is unfolded into a straight line is located at an inner side of the metal straight edges, or located at an outer side of the metal straight edges.

Further, the equivalent resonant circuit is in a linear shape, the U-shaped open-circuit unit that is unfolded into the straight line is located at a same side as the other U-shaped open-circuit unit, or the U-shaped open-circuit that is unfolded into the straight line and the other U-shaped open-circuit unit are located at two sides of the metal straight edges.

Further, when the U-shaped open-circuit unit that is unfolded into straight line and the other U-shaped open-circuit unit are located at two sides of the metal straight edges, the U-shaped open-circuit unit that is unfolded into the straight line is arranged at the top layer of the baseboard, and the other U-shaped open-circuit unit is arranged at the bottom layer of the baseboard; or the U-shaped open-circuit unit that is unfolded into the straight line is arranged at the bottom layer of the baseboard, and the other U-shaped open-circuit unit is arranged at the top layer of the baseboard.

Further, the feed block is right opposite to a wave-transmitting/filtering unit;

- in the first and third radiation arms, a length of a connecting line between the feed block and the exactly opposite wave-transmitting/filtering unit is 0.44 to 0.5 times a wavelength corresponding to an operation center frequency of the low-frequency radiation unit; and
- in the second and fourth radiation arms, a length of a connecting line between the feed block and the exactly opposite wave-transmitting/filtering unit is 0.22 to 0.25 times the wavelength corresponding to the operation center frequency of the low-frequency radiation unit.

The second purpose of the present disclosure may be achieved by employing the following technical solutions:

- a shared-aperture antenna array includes a first antenna, a second antenna, and a reflection plate, where the first antenna is the wide-band wave-transmitting/filtering radiation unit described above, the second antenna is a high-frequency radiation array, the wide-band wave-transmitting/filtering radiation unit and the high-frequency radiation array are distributed on the reflection plate, and the wide-band wave-transmitting/filtering radiation unit is disposed in the high-frequency radiation array.

Further, the shared-aperture antenna array is extended into a multilayer structure, and each layer is loaded with a resonant structure to form a multi-frequency resonant circuit, to realize multi-frequency wave-transmitting/filtering characteristics.

The third purpose of the present disclosure may be achieved by employing the following technical solutions:

- a mobile communication device includes a wide-band wave-transmitting/filtering radiation unit described above, or including a satellite communication wave-filtering shared-aperture antenna array described above.

Compared with the prior art, the present disclosure has the following beneficial effects:

The wide-band wave-transmitting/filtering radiation unit of the present disclosure is simple in structure, and integrates a wave filtering function on the premise of maintaining good wave-transmitting performance, thereby having important research significance and promising application prospect; and in addition, the wave-transmitting/filtering unit is added on the basis of the radiator of the radiation unit, thereby effectively improving a radiation pattern of the high-frequency radiation array, and widening a standing wave bandwidth of the radiation unit.

BRIEF DESCRIPTION OF THE DRAWINGS

To more clearly describe the technical solutions in the embodiments of the present invention or in the prior art, the drawings required to be used in the description of the embodiments or in the prior art are simply presented below. Apparently, the following drawings show some embodiments of the present invention, so for those ordinary skilled in the art, other drawings can also be obtained according to these drawings without contributing creative labor.

Figure 1:
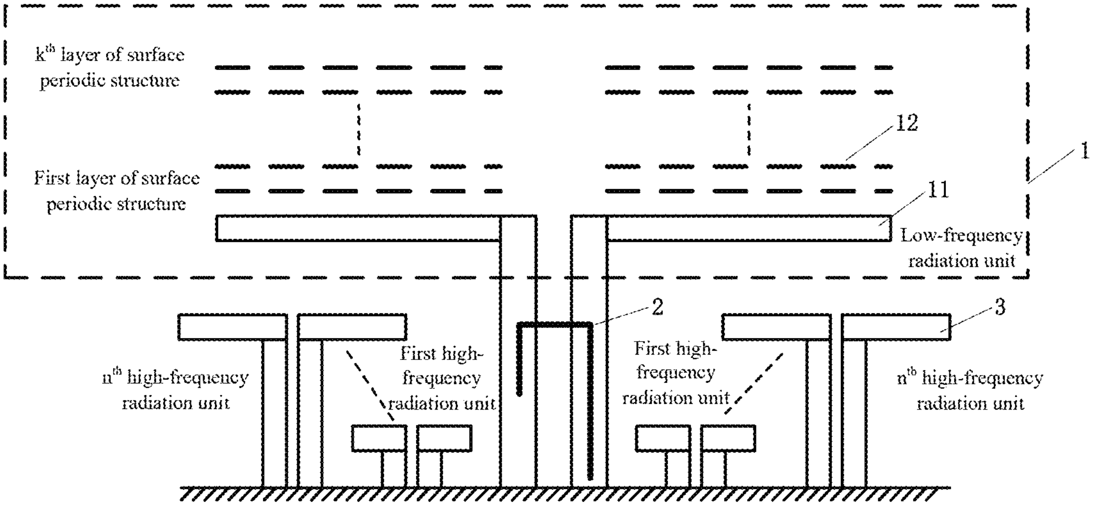
FIG. 1 is a structural schematic diagram of a wide-band wave-transmitting/filtering radiation unit according to Embodiment 1 of the present disclosure.

Reference numerals: 1—radiation structure; 11—radiator; 111—baseboard; 112—first radiation arm; 113—second radiation arm; 1131—wave-transmitting/filtering unit; 11311—metal straight edge; 11312—first U-shaped open-circuit unit; 11313—second U-shaped open-circuit unit; 1132—feed block; 114—third radiation arm; 115—fourth radiation arm; 12—surface periodic structure; 2—feed structure; 3—high-frequency radiation unit; and 4—reflection plate.

DETAILED DESCRIPTION OF THE EMBODIMENTS

To make the above purposes, characteristics, and advantages of the present disclosure more apparent and understood, specific embodiments of the present disclosure are described in detail below in combination with the accompanying drawings. More specific details are described in the following descriptions to fully understand the present disclosure. However, the present disclosure can be implemented in numerous other ways different from the descriptions herein. Those skilled in the art can make similar improvements without violating the connotation of the present disclosure. Therefore, the present disclosure is not limited by the specific embodiments disclosed below.

It is to be stated that when one element is regarded as being connected with another element, the element may be directly connected to the other element, or connected to the other element via an intermediate element. In the following embodiments, "connection" shall be understood as "electrical connection", "communication connection", or the like, if connected circuits, modules, units, or the like have electrical signals or data transmitted between each other.

As used herein, singular forms "a", "an", and "the" may also include plural forms, unless specified otherwise in the context clearly. It should also be understood that the terms "comprise/include" or "have" specify the presence of stated features, integers, steps, operations, components, parts, or combinations thereof, but do not preclude the presence or addition of one or more other features, integers, steps, operations, components, parts, or combinations thereof. At the same time, terms used in the present specification include any or all combinations of relevant listed items.

Embodiment 1

As shown in FIG. 1, the present embodiment provides a wide-band wave-transmitting/filtering radiation unit. The radiation unit is a low-frequency radiation unit, and includes a radiation structure 1 and a feed structure 2, where the radiation structure 1 and the feed structure 2 are coupled for feeding, whereby the radiation structure 1 radiates low-frequency electromagnetic wave signals outward, the radiation structure includes a radiator 11, and the radiator 11 is loaded with a plurality of layers of surface periodic structures 12.

Figure 2:
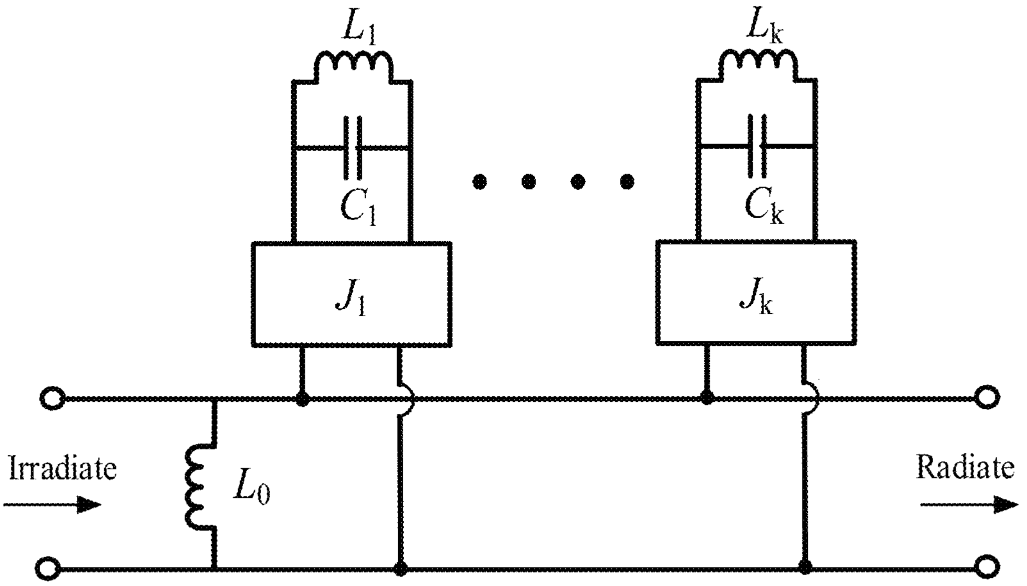
FIG. 2 is a diagram of an equivalent spatial band-pass filter circuit when a radiation structure operates in a first mode according to Embodiment 1 of the present disclosure.
Figure 3:
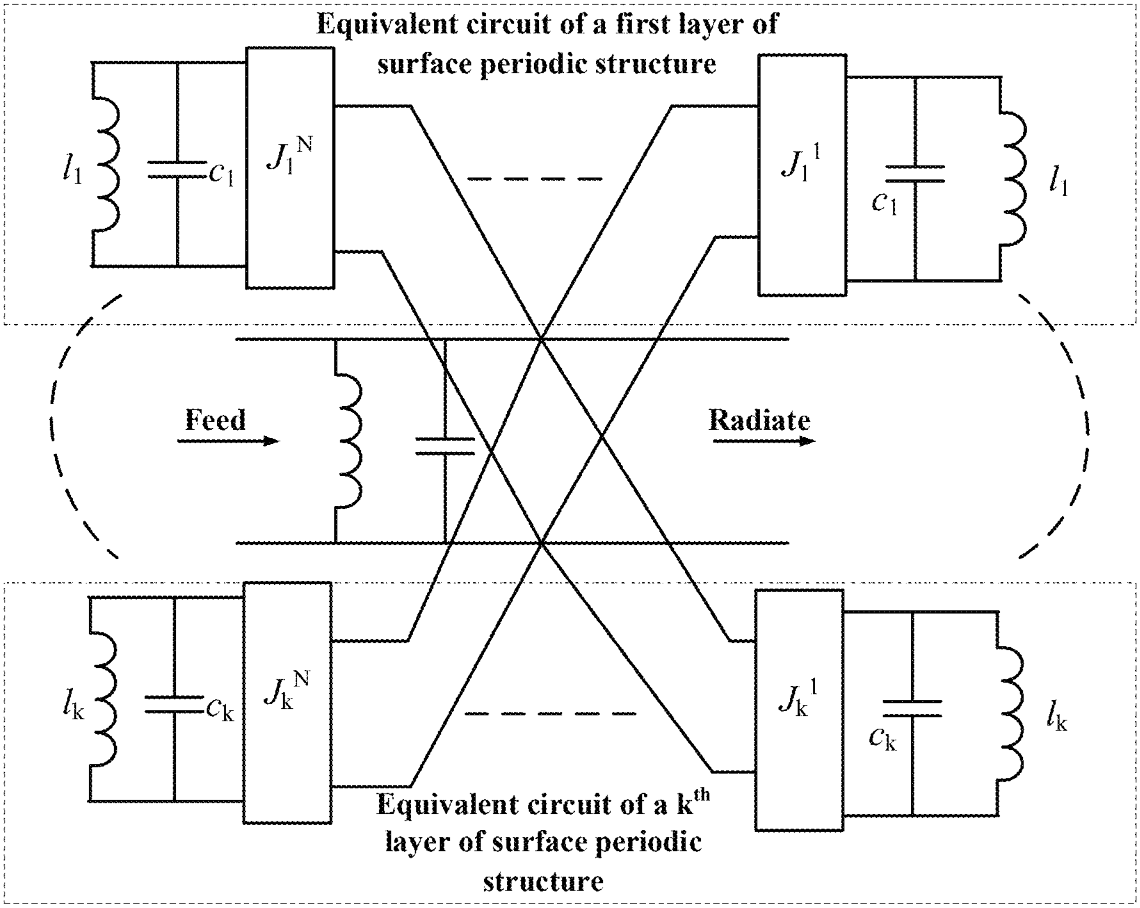
FIG. 3 is a diagram of an equivalent filter circuit when a radiation structure operates in a second mode according to Embodiment 1 of the present disclosure.
Figure 4:
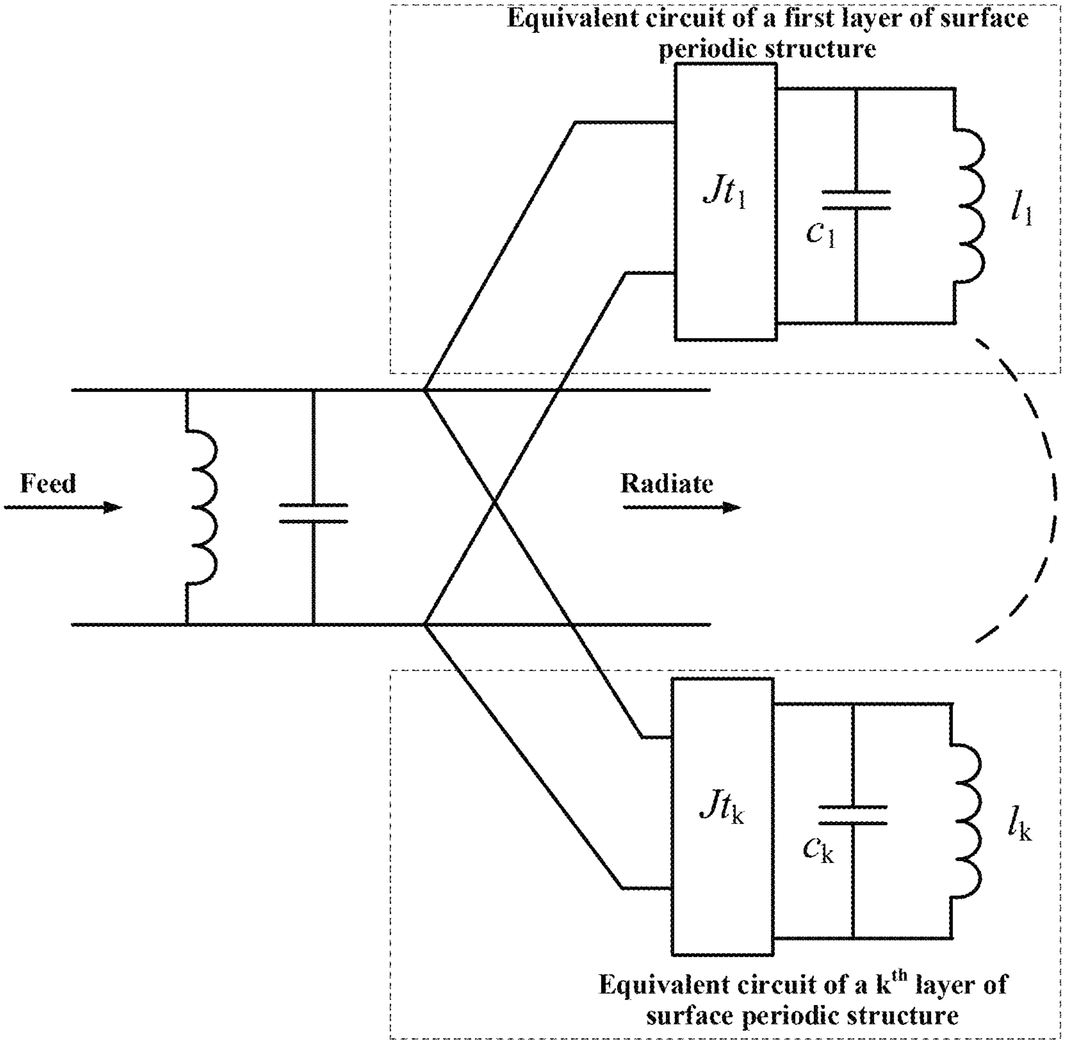
FIG. 4 is a diagram of an equivalent non-resonant node filter circuit after combination of FIG. 3.

The radiation structure 1 in the present embodiment has two operation modes, i.e., a first mode and a second mode; when the radiation structure 1 operates in the first mode, electromagnetic waves excited by a high-frequency radiation unit 3 may irradiate the radiation structure 1; a matrix arm on the radiation structure 1 and the plurality of layers of surface periodic structures collectively form a non-resonant node (NRN) spatial band-pass filter circuit with K resonant points and K null points as shown in FIG. 2, whereby electromagnetic wave energy excited by a plurality of high-frequency radiation units 3 may completely pass through the low-frequency radiation unit as far as possible, and a high-frequency array radiation pattern is improved; when the radiation structure 1 operates in the second mode, low-frequency electromagnetic waves excite the radiation structure 1 by means of a feed portion, then the plurality of layers of surface periodic structures 12 may be excited by the radiator 11 in a parallel manner to form an equivalent filter circuit as shown in FIG. 3, and after circuit conversion and combination, the equivalent filter circuit in FIG. 3 may be combined into the equivalent non-resonant node filter circuit as shown in FIG. 4; and it is proved that the non-resonant node structure in FIG. 4 may generate k radiation null points, and the frequency of the radiation null point is identical to the resonant frequency of the unit of each layer of surface periodic structure. Consequently, the frequency of the radiation null point can be regulated by modulating the resonant frequency of the units of the periodic surfaces, thereby improving the out-of-band suppression of the antenna, where $K \geq 1$.

Figure 5:
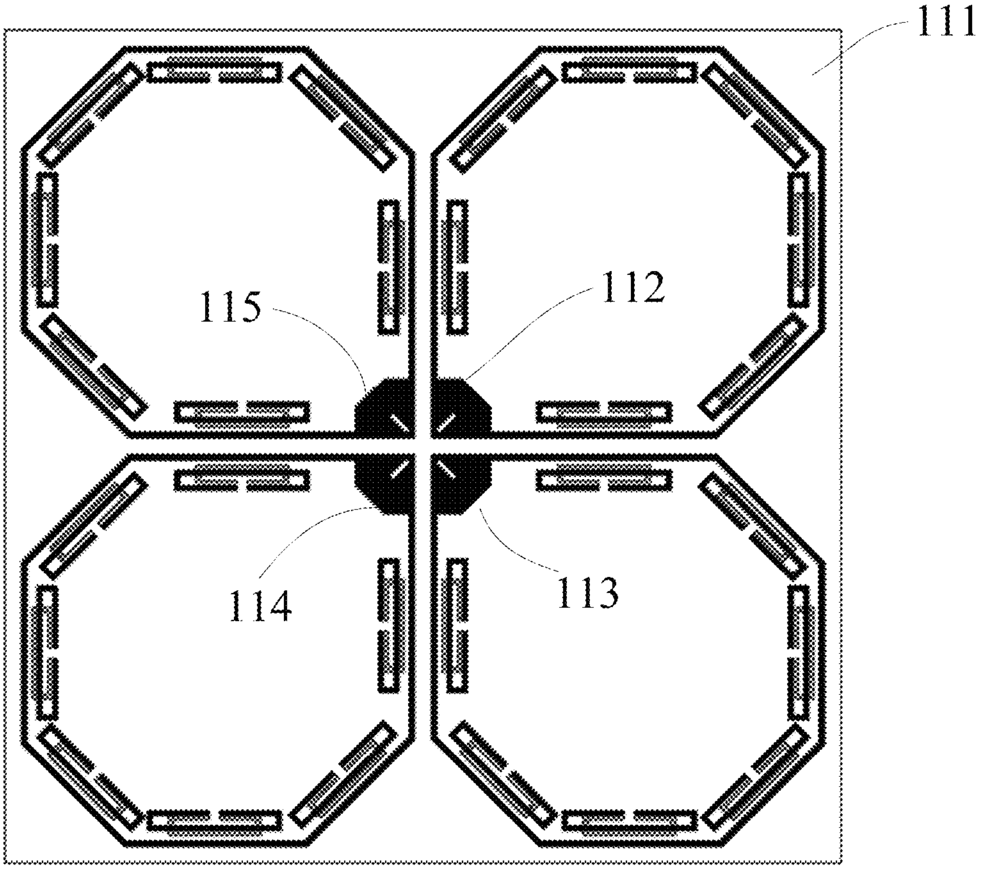
FIG. 5 is a structural schematic diagram of a radiation structure according to Embodiment 1 of the present disclosure.

As shown in FIG. 1 and FIG. 5, in the radiation structure 1 of the present embodiment, the radiator 11 includes four radiation arms, the four radiation arms are arranged on a baseboard 111, the four radiation arms are a first radiation arm 112, a second radiation arm 113, a third radiation arm 114, and a fourth radiation arm 115, the first radiation arm 112 and the third radiation arm 114 constitute +45° polarization of the low-frequency radiation unit, and the second radiation arm 113 and the fourth radiation arm 115 constitute −45° polarization of the low-frequency radiation unit; and circuits on the radiator 11 may be etched on a top layer and a bottom layer of the baseboard 111 by employing a printed circuit board (PCB), where a solid portion is the top layer circuit of the baseboard 111, a slash portion is the bottom layer circuit of the baseboard 111, or inversely, the solid portion is the bottom layer circuit of the baseboard 111, and the slash portion is the top layer circuit of the baseboard 111.

Figure 6:
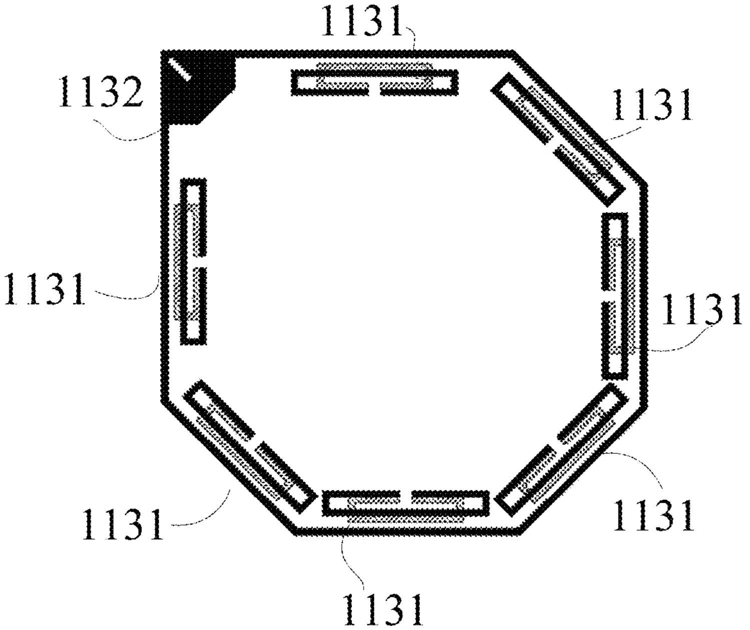
FIG. 6 is a structural schematic diagram of a radiation arm according to Embodiment 1 of the present disclosure.
Figure 7:
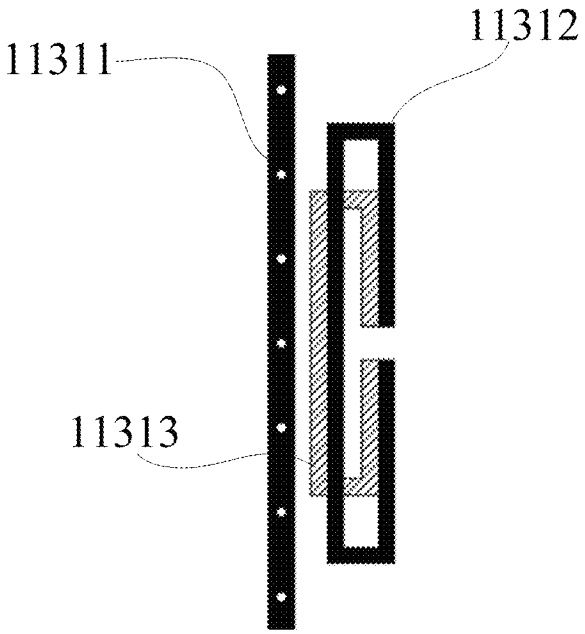
FIG. 7 is a structural schematic diagram of a wave-transmitting/filtering unit according to Embodiment 1 of the present disclosure.

As shown in FIG. 6, FIG. 6 is a structural diagram of the radiation arm in the present embodiment. Taking the second radiation arm 113 as an example, the second radiation arm 113 includes seven wave-transmitting/filtering units 1131 and a feed block 1132; as shown in FIG. 7, each wave-transmitting/filtering unit 1131 includes two metal straight edges 11311, a first U-shaped open-circuit unit 11312, and a second U-shaped open-circuit unit 11313, the feed block 1132 is connected with the feed structure 2, the two metal straight edges 11311 are respectively arranged at the top layer and the bottom layer of the baseboard 111, the two metal straight edges 11311 are connected via a metal through hole, the metal straight edges 11311 of the seven wave-transmitting/filtering units 1131 and the feed block 1132 are sequentially connected to form an annular octagon, and a rotating angle of every two adjacent wave-transmitting/filtering units 1131 is 30° to 45°; and the first U-shaped open-circuit unit 11312 and the second U-shaped open-circuit unit 11313 are arranged at one side of the metal straight edges 11311, the first U-shaped open-circuit unit 11312 is arranged at the top layer of the baseboard 111, and the second U-shaped open-circuit unit 11313 is arranged at the bottom layer of the baseboard 111. It may be understood that positions of the first U-shaped open-circuit unit 11312 and the second U-shaped open-circuit unit 11313 are interchangeable, that is, the first U-shaped open-circuit unit 11312 is arranged at the bottom layer of the baseboard 111, and the second U-shaped open-circuit unit 11313 is arranged at the top layer of the baseboard 111.

Further, the two metal straight edges 11311 are regarded as one metal component, the first U-shaped open-circuit unit 11312 and the second U-shaped open-circuit unit 11313 are respectively two metal components, and the three metal components may form two frequency band transmission channels in a high frequency band; and a width of the metal straight edges 11311 is 1.5 mm to 2 mm. Excessively narrow line widths exhibit relatively high electrical inductance characteristics, which is unfavorable for impedance matching of the low-frequency radiation unit, and affects an operation bandwidth of the low-frequency radiation unit, whereas excessively wide line widths tend to induce excessively strong surface waves when high-frequency electromagnetic waves irradiate the wave-transmitting unit, adversely affecting the wave-transmitting performance. A total length of the first U-shaped open-circuit unit 11312 and the second U-shaped open-circuit unit 11313 is half of an operation wavelength of the corresponding wave-transmitting frequency band, the line width is 1 mm to 2 mm, a width of a U-shaped opening is 2 mm to 5 mm, and distances from the first U-shaped open-circuit unit 11312 and the second U-shaped open-circuit 11313 to the metal straight edges 11311 are 0.01 to 0.03 times a wavelength of the corresponding frequency band; dual-band or wide-band wave transmission is achieved by controlling a resonant frequency of the first U-shaped open-circuit unit 11312 and the second U-shaped open-circuit unit 11313; and the first U-shaped open-circuit unit 11312 and the second U-shaped open-circuit unit 11313 do not radiate energy externally under the effect of their inherent current, thereby generating two null points in the high-frequency band to effectively suppress the radiation of the low-frequency radiation unit in the high frequency band. The feed block 1132 is right opposite to one wave-transmitting/filtering unit 1131, a length of a connecting line between the feed block 1132 in the second radiation arm 113 and the exactly opposite wave-transmitting/filtering unit 1131 is 0.22 to 0.25 times a wavelength corresponding to an operation center frequency of the low-frequency radiation unit; and correspondingly, a length of a connecting line between the feed block in the fourth radiation arm 115 and the exactly opposite wave-transmitting/filtering unit is also 0.22 to 0.25 times the wavelength corresponding to the operation center frequency of the low-frequency radiation unit. However, in the first radiation arm 112 and the third radiation arm 114, the length of the connecting line between the feed block and the exactly opposite wave-transmitting/filtering unit is 0.44 to 0.5 times the wavelength corresponding to the operation center frequency of the low-frequency radiation unit.

Figure 8:
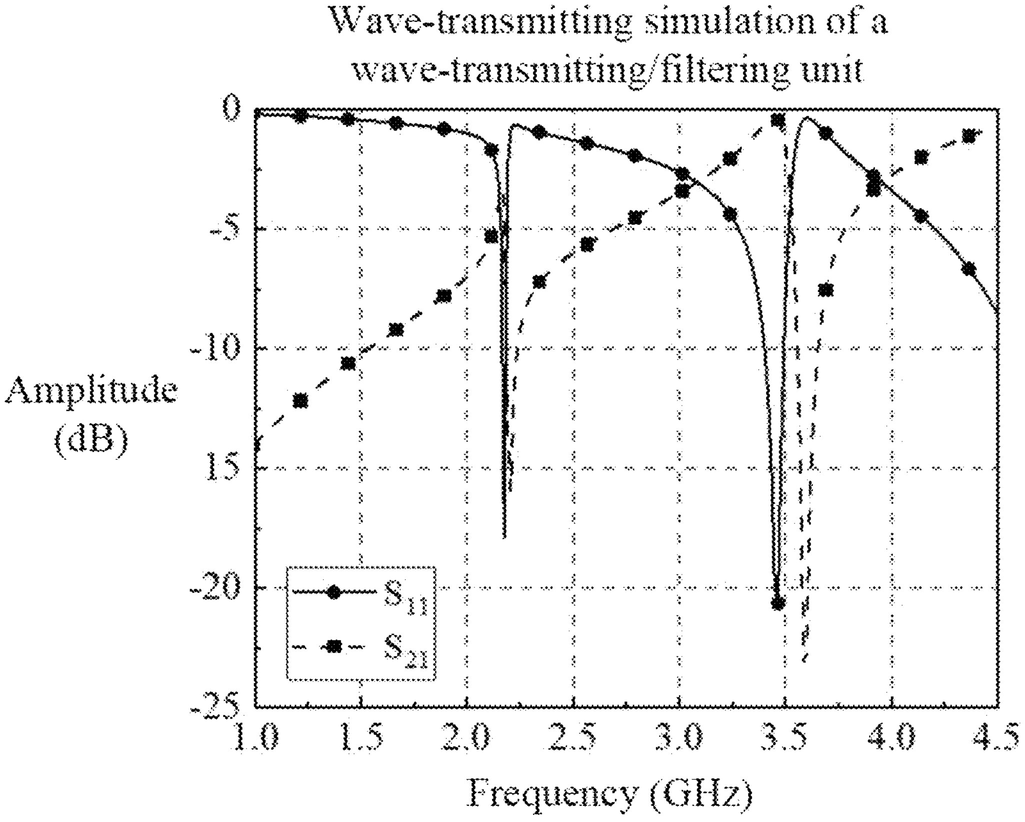
FIG. 8 is a diagram of a wave-transmitting simulation result of a wave-transmitting/filtering unit according to Embodiment 1 of the present disclosure.
Figure 9:
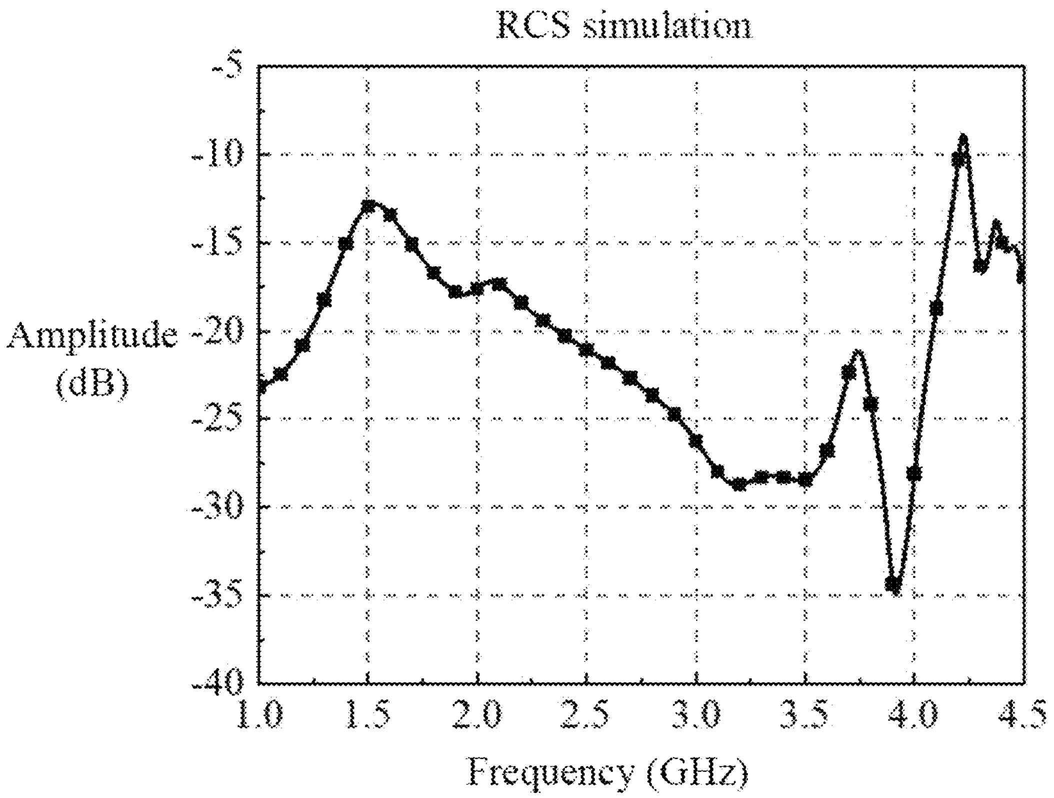
FIG. 9 is a diagram of a radar cross section (RCS) simulation result of a radiation arm according to Embodiment 1 of the present disclosure.

As shown in FIG. 8, FIG. 8 illustrates simulation performance indexes of incident waves of high-frequency electromagnetic waves radiated to the wave-transmitting/filtering unit. There are two resonant points at 3.48 GHz and 2.24 GHz. On the surface, the two U-shaped open-circuit units resonate at 3.48 GHz and 2.24 GHz, and S21 indicates energy loss of the incident waves after passing through the wave-transmitting unit in the operation frequency band, which is between 0.11 dB and 0.29 dB from a simulation result; and since the single wave-transmitting/filtering unit is a typical resonant circuit with relatively narrow operation bandwidth, a plurality of wave-transmitting/filtering units are connected to form the radiation arm for radar cross section (RCS) simulation. As shown in FIG. 9, amplitudes are less than −15 dB in an entire frequency band of 2 GHz to 4 GHz, which indicates that the radiation arm structure has excellent wave-transmitting characteristics.

Figure 10:
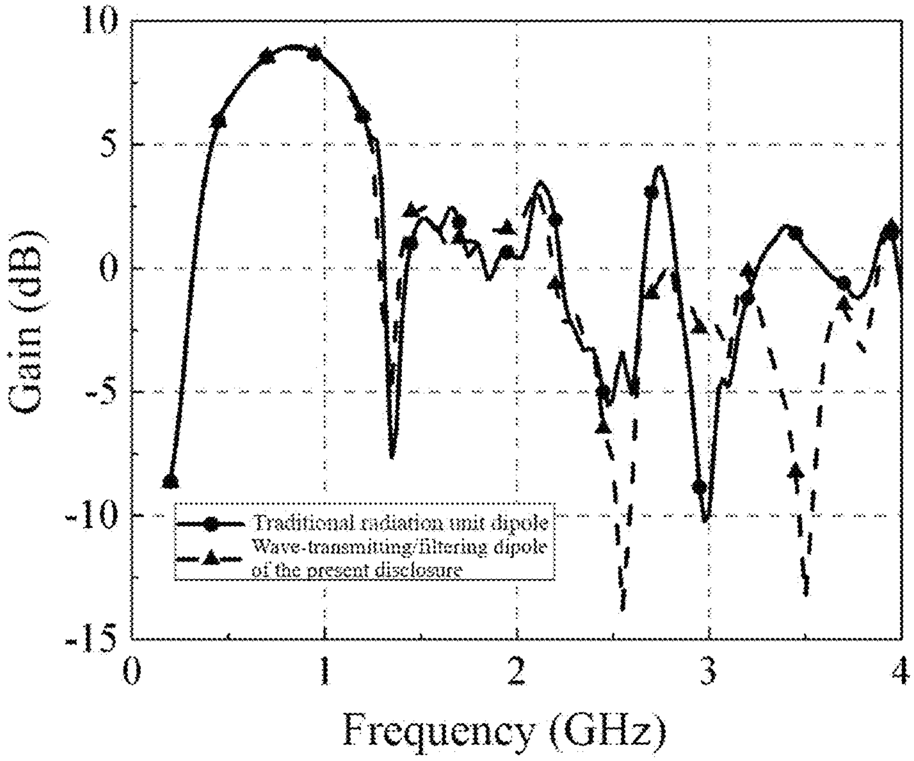
FIG. 10 is a diagram illustrating comparison between gain curves of a wide-band wave-transmitting/filtering radiation unit according to Embodiment 1 of the present disclosure and a conventional low-frequency radiation unit.

As shown in FIG. 10, FIG. 10 illustrates a comparison between gain curves of the wide-band wave-transmitting/filtering radiation unit in the present embodiment and the traditional low-frequency radiation unit. It may be seen from the figure that in a frequency band of 0.6 GHz to 0.96 GHz, a gain reaches 8 dB, and the two gain curves are highly overlapped, which indicates that the addition of the wave-transmitting/filtering unit does not affect the radiation characteristics in the low frequency band. There are two obvious resonant points (null points) at the frequencies of 2.4 GHz and 3.6 GHz, so that the gain at the frequencies of 2.4 GHz and 3.6 GHz is less than 0 dB, which effectively suppresses the radiation of the low-frequency radiation unit in the high frequency band, and presents wave-filtering characteristics.

Embodiment 2

Figure 11:
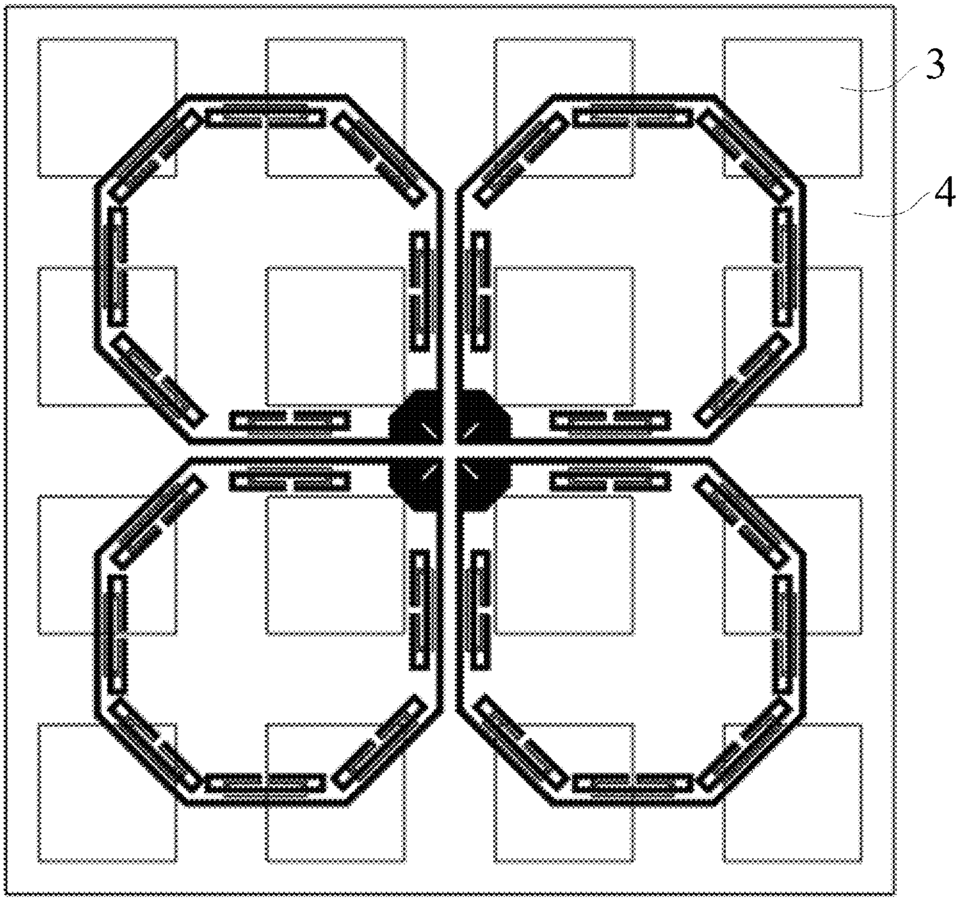
FIG. 11 is a structural schematic diagram of a shared-aperture antenna array according to Embodiment 2 of the present disclosure.

As shown in FIG. 11, the present embodiment provides a shared-aperture antenna array. The antenna array includes a first antenna, a second antenna, and a reflection plate 4. The first antenna is the wide-band wave-transmitting/filtering radiation unit in embodiment 1, and the second antenna is a high-frequency radiation array. The wide-band wave-transmitting/filtering radiation unit and the high-frequency radiation array are distributed on the reflection plate 4, and the wide-band wave-transmitting/filtering radiation unit is disposed in the high-frequency radiation array. Power is fed from front or back surfaces of the antenna by means of a cable or a PCB. The high-frequency radiation array includes a plurality of high-frequency radiation units 3. The high-frequency radiation units 3 used in the high-frequency radiation array are dual-polarization dipole units. The low-frequency radiation unit operates in a frequency band of 617 MHz to 960 MHz, and the high-frequency radiation array operates in a frequency band of 2400 MHz to 3800 MHz. When high-frequency electromagnetic waves of the second antenna are incident on the radiator of the first antenna, the wave-transmitting/filtering unit on the radiator plays a role of a spatial filter in filtering the high-frequency electromagnetic waves in the corresponding frequency band, whereby the electromagnetic waves of the second antenna completely pass through the first antenna. Thus it can be seen that the wave-transmitting/filtering unit on the radiator has an effect on transmitting the high-frequency electromagnetic waves.

Embodiment 3

Figure 12:
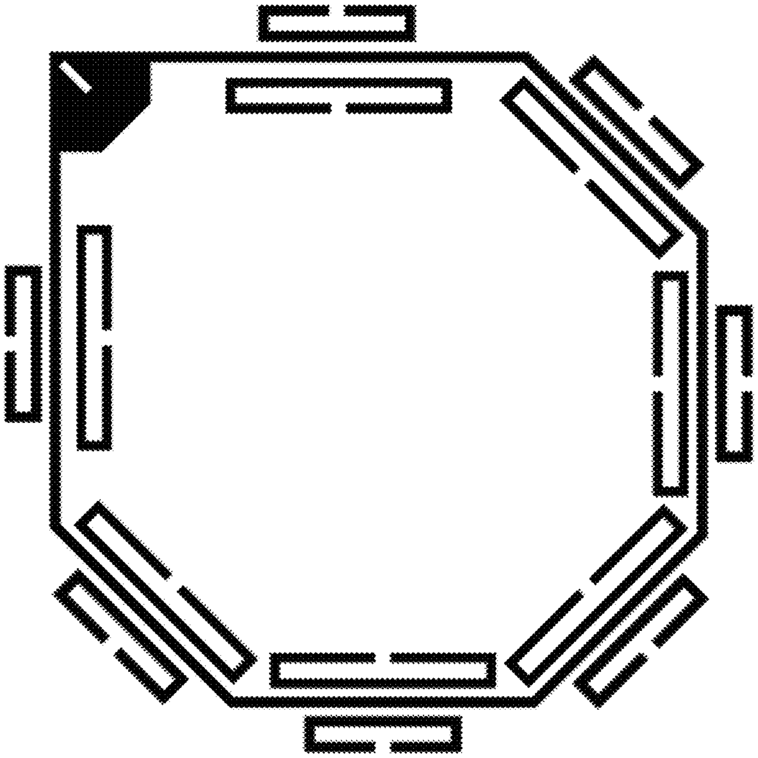
FIG. 12 is a structural schematic diagram of a radiation arm according to Embodiment 3 of the present disclosure.

As shown in FIG. 12, in a radiation arm of the present embodiment, a first U-shaped open-circuit unit and a second U-shaped open-circuit unit are located at two sides of metal straight edges, and a separation distance from the first and second U-shaped open-circuit units to the metal straight edges is respectively 0.01 to 0.03 times a wavelength of a corresponding frequency band. The first and second U-shaped open-circuit units of the present embodiment are collectively arranged at a top layer of a baseboard; and according to a mirror image principle, the first and second U-shaped open-circuit units may also be collectively arranged at a bottom layer of the baseboard. It may be understood that the first U-shaped open-circuit unit may be arranged at the top layer of the baseboard, and the second U-shaped open-circuit unit may be arranged at the bottom layer of the baseboard; or the first U-shaped open-circuit unit may be arranged at the bottom layer of the baseboard, and the second U-shaped open-circuit unit may be arranged at the top layer of the baseboard.

Embodiment 4

Figure 13:
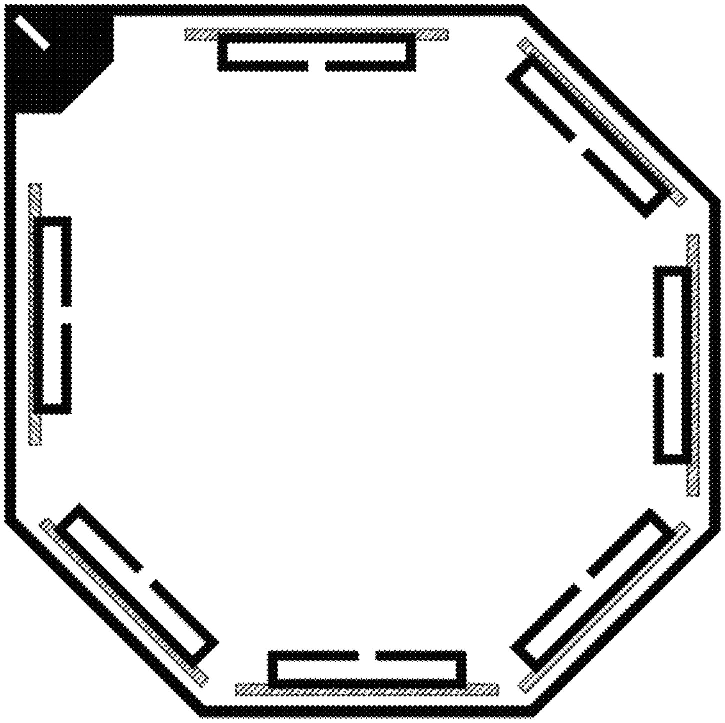
FIG. 13 is a structural schematic diagram of a radiation arm according to Embodiment 4 of the present disclosure.

As shown in FIG. 13, in a radiation arm of the present embodiment, a first U-shaped open-circuit unit is unfolded into a straight line, the first U-shaped open-circuit unit that is unfolded into the straight line is called a linear open-circuit unit, the linear open-circuit unit and the second U-shaped open-circuit unit are located at an inner side of the metal straight edges, and a separation distance from the linear open-circuit unit and the second U-shaped open-circuit unit to the metal straight edges is respectively 0.01 to 0.03 times a wavelength of a corresponding frequency band. The linear open-circuit unit and the second U-shaped open-circuit unit of the present embodiment are respectively arranged at a top layer of the baseboard; and according to a mirror image principle, the linear open-circuit unit and the second U-shaped open-circuit unit may also be collectively arranged at a bottom layer of the baseboard. It can be understood that the linear open-circuit unit and the second U-shaped open-circuit unit may also be arranged at an outer side of the metal straight edges.

Embodiment 5

Figure 14:
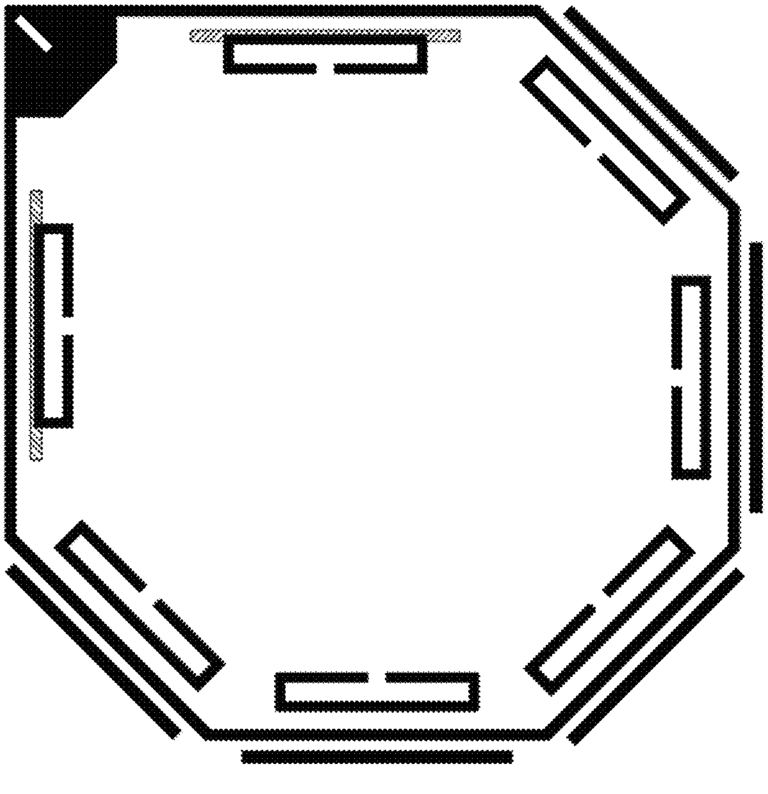
FIG. 14 is a structural schematic diagram of a radiation arm according to Embodiment 5 of the present disclosure.

As shown in FIG. 14, in a radiation arm of the present embodiment, a first U-shaped open-circuit unit is unfolded into a straight line, the first U-shaped open-circuit unit that unfolded into the straight line is called a linear open-circuit unit, the linear open-circuit unit and the second U-shaped open-circuit unit are located at two sides of the metal straight edges, and a separation distance from the linear open-circuit unit and the second U-shaped open-circuit unit to the metal straight edges is respectively 0.01 to 0.03 times a wavelength of a corresponding frequency band. The linear open-circuit unit and the second U-shaped open-circuit unit of the present embodiment are collectively arranged at a top layer of the baseboard; and according to a mirror image principle, the linear open-circuit unit and the second U-shaped open-circuit unit may also be collectively arranged at a bottom layer of the baseboard. It may be understood that the linear open-circuit unit may be arranged at the top layer of the baseboard, and the second U-shaped open-circuit unit may be arranged at the bottom layer of the baseboard; or the linear open-circuit unit may be arranged at the bottom layer of the baseboard, and the second U-shaped open-circuit unit may be arranged at the top layer of the baseboard.

In Embodiments 4 and 5, the U-shaped open-circuit that is unfolded into the straight line may also be the second U-shaped open-circuit unit. In addition to being unfolded into the straight line, the U-shaped open-circuit may also be unfolded into another shape of other equivalent resonant circuits.

In conclusion, the wide-band wave-transmitting/filtering radiation unit of the present disclosure is simple in structure, and integrates a wave filtering function on the premise of maintaining good wave-transmitting performance, thereby having important research significance and promising application prospect; and in addition, the wave-transmitting/filtering unit is added on the basis of the radiator of the radiation unit, thereby effectively improving a radiation pattern of the high-frequency radiation array, and widening a standing wave bandwidth of the radiation unit.

Technical features of the foregoing embodiments may be combined in any manner. To make description concise, not all possible combinations of the technical features in the foregoing embodiments are described. However, the combinations of these technical features shall be considered as falling within the scope recorded by the present specification provided that no conflict exists.

The foregoing embodiments only describe several implementations of the present application, and the descriptions are specific and detailed, but is not to be construed as limitations to the patent scope of the present disclosure. For a person of ordinary skill in the art, several transformations and improvements may be made without departing from the idea of the present application. These transformations and improvements belong to the protection scope of the present application. Therefore, the protection scope of the present application shall be subject to the attached claims.

The invention claimed is:

1. A wide-band wave-transmitting/filtering radiation unit, comprising a radiation structure and a feed structure, wherein the radiation structure and the feed structure are coupled for feeding, whereby the radiation structure radiates low-frequency electromagnetic wave signals outward, the radiation structure comprises a radiator, and the radiator is loaded with a plurality of layers of surface periodic structures;

when the radiation structure operates in a first mode, electromagnetic waves excited by a high-frequency radiation unit irradiate the radiation structure, the radiator and the plurality of layers of surface periodic structures on the radiation structure collectively form a non-resonant node spatial band-pass filter circuit with K resonant points and K null points, and K≥1;

when the radiation structure operates in a second mode, low-frequency electromagnetic waves excite the radiation structure by means of the feed structure, units of the plurality of layers of surface periodic structures are excited by the radiator in a parallel manner to form an equivalent filter circuit;

the radiator comprises four radiation arms, the four radiation arms are arranged on a baseboard, the four radiation arms are respectively a first radiation arm, a second radiation arm, a third radiation arm, and a fourth radiation arm, the first radiation arm and the third radiation arm constitute +45° polarization of a low-frequency radiation unit, and the second radiation arm and the fourth radiation arm constitute −45° polarization of the low-frequency radiation unit; and each radiation arm comprises a plurality of wave-transmitting/filtering units and a feed block, each wave-transmitting/filtering unit comprises two metal straight edges, a first open-circuit unit, and a second open-circuit unit, and the feed block is connected with the feed structure; the two metal straight edges are respectively arranged at a top layer and a bottom layer of the baseboard, the two metal straight edges are connected via a metal through hole, and the metal straight edges of the plurality of wave-transmitting/filtering units and the feed block are sequentially connected to form an annular polygon; and the first open-circuit unit and the second open-circuit unit are located at one side or two sides of the metal straight edges, and dual-band or wide-band wave transmission is achieved by controlling a resonant frequency of the first open-circuit unit and the second open-circuit unit.

2. The wide-band wave-transmitting/filtering radiation unit according to claim 1, wherein the first open-circuit unit and the second open-circuit unit are both U-shaped open-circuit units.

3. The wide-band wave-transmitting/filtering radiation unit according to claim 2, wherein when the first open-circuit unit and the second open-circuit unit are located at one side of the metal straight edges, the first open-circuit unit is arranged at the top layer of the baseboard, and the second open-circuit unit is arranged at the bottom layer of the baseboard; or the first open-circuit unit is arranged at the bottom layer of the baseboard, and the second open-circuit unit is arranged at the top layer of the baseboard.

4. The wide-band wave-transmitting/filtering radiation unit according to claim 2, wherein when the first open-circuit unit and the second open-circuit unit are located at two sides of the metal straight edges, the first open-circuit unit is arranged at the top layer of the baseboard, and the second open-circuit unit is arranged at the bottom layer of the baseboard; or the first open-circuit unit is arranged at the bottom layer of the baseboard, and the second open-circuit unit is arranged at the top layer of the baseboard; or the first open-circuit unit and the second open-circuit unit are collectively arranged at the top layer of the baseboard; or the first open-circuit unit and the second open-circuit unit are collectively arranged at the bottom layer of the baseboard.

5. The wide-band wave-transmitting/filtering radiation unit according to claim 2, wherein a width of the metal straight edges is 1.5 mm to 2 mm.

6. The wide-band wave-transmitting/filtering radiation unit according to claim 2, wherein a total length of the first open-circuit unit and the second open-circuit unit is half of an operation wavelength of a corresponding wave-transmitting frequency band, a line width is 1 mm to 2 mm, a width of a U-shaped opening is 2 mm to 5 mm, and distances from the first and second open-circuit units to the metal straight edges are respectively 0.01 to 0.03 times a wavelength of the corresponding frequency band.

7. The wide-band wave-transmitting/filtering radiation unit according to claim 1, wherein one of the first and second open-circuit units is in a shape of the equivalent resonant circuit, and the other open-circuit unit is a U-shaped open-circuit unit.

8. The wide-band wave-transmitting/filtering radiation unit according to claim 7, wherein the equivalent resonant circuit is in a linear shape, and the linear open-circuit unit is located at an inner side of the metal straight edges, or located at an outer side of the metal straight edges.

9. The wide-band wave-transmitting/filtering radiation unit according to claim 7, wherein the equivalent resonant circuit is in a linear shape, the linear open-circuit unit is located at a same side as the U-shaped open-circuit unit, or the linear open-circuit unit and the U-shaped open-circuit unit are located at two sides of the metal straight edges.

10. The wide-band wave-transmitting/filtering radiation unit according to claim 9, wherein when the linear open-circuit unit and the U-shaped open-circuit unit are located at two sides of the metal straight edges, the linear open-circuit unit is arranged at the top layer of the baseboard, the U-shaped open-circuit unit is arranged at the bottom layer of the baseboard, or the linear open-circuit unit is arranged at the bottom layer of the baseboard, and the U-shaped open-circuit unit is arranged at the top layer of the baseboard.

11. The wide-band wave-transmitting/filtering radiation unit according to claim 1, wherein the feed block is right opposite to one wave-transmitting/filtering unit;

in the first and third radiation arms, a length of a connecting line between the feed block and the exactly opposite wave-transmitting/filtering unit is 0.44 to 0.5 times a wavelength corresponding to an operation center frequency of the low-frequency radiation unit; and in the second and fourth radiation arms, a length of a connecting line between the feed block and the exactly opposite wave-transmitting/filtering unit is 0.22 to 0.25 times the wavelength corresponding to the operation center frequency of the low-frequency radiation unit.

12. A shared-aperture antenna array, comprising a first antenna, a second antenna, and a reflection plate, wherein the first antenna is the wide-band wave-transmitting/filtering radiation unit according to claim 1, the second antenna is a high-frequency radiation array, the wide-band wave-transmitting/filtering radiation unit and the high-frequency radiation array are distributed on the reflection plate, and the wide-band wave-transmitting/filtering radiation unit is disposed in the high-frequency radiation array.

13. The shared-aperture antenna array according to claim 12, wherein the shared-aperture antenna array is extended into a multilayer structure, and each layer is loaded with a resonant structure to form a multi-frequency resonant circuit, to realize multi-frequency wave-transmitting/filtering characteristics.

14. A mobile communication device, comprising the wide-band wave-transmitting/filtering radiation unit according to claim 1.

* * * * *